United States Patent [19]

St. Clair et al.

[11] Patent Number: 5,218,077

[45] Date of Patent: Jun. 8, 1993

[54] DIPHENYLMETHANE-CONTAINING DIANHYDRIDE AND POLYIMIDES PREPARED THEREFROM

[75] Inventors: Anne K. St. Clair, Poqouson; Harold G. Boston, Hampton, both of Va.; J. Richard Pratt, Fayetteville, N.C.

[73] Assignee: The United States of America as represented by the Administrator of the National Aeronautics and Space Administration, Washington, D.C.

[21] Appl. No.: 750,158

[22] Filed: Aug. 26, 1991

[51] Int. Cl.[5] .................... C08G 73/10; C08G 69/26; C08G 8/02

[52] U.S. Cl. .................... 528/188; 528/125; 528/126; 528/128; 528/172; 528/173; 528/179; 528/182; 528/185; 528/220; 528/229; 528/351; 528/352; 528/353

[58] Field of Search ............... 528/188, 126, 125, 128, 528/172, 173, 179, 182, 185, 188, 220, 229, 351, 352, 353

[56] References Cited

U.S. PATENT DOCUMENTS

| | | | |
|---|---|---|---|
| 4,595,548 | 6/1987 | St. Clair et al. | 528/183 |
| 4,634,760 | 1/1987 | Takekoshi et al. | 528/183 |
| 4,895,972 | 1/1990 | Stoakley et al. | 528/188 |
| 5,061,783 | 10/1991 | St. Clair | 528/188 |

Primary Examiner—John Kight, III
Assistant Examiner—P. Hampton-Hightower
Attorney, Agent, or Firm—George F. Helfrich

[57] ABSTRACT

A high-temperature stable, highly optically transparent-to-colorless, low dielectric linear aromatic polyimide is prepared by reacting an aromatic diamine with 3,3'bis(3,4-dicarboxyphenoxy)diphenylmethane dianhydride in an amide solvent to form a linear aromatic polyamic acid. This polyamic acid is then cyclized to form the corresponding polyimide, which has the following general structural formula:

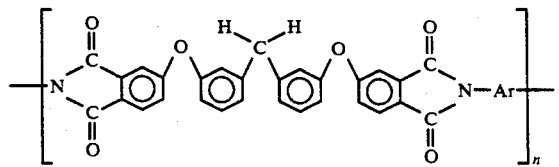

wherein Ar is any aromatic or substituted aromatic group, and n is 10-100.

9 Claims, 4 Drawing Sheets

Route for preparing PDMDA containing polyimides

DIPHENYLMETHANE-CONTAINING DIANHYDRIDE AND POLYIMIDES PREPARED THEREFROM

ORIGIN OF THE INVENTION

The invention described herein was jointly made in the performance of work under a NASA Contract and by a Government employee and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

This invention relates generally to polyimides. It relates particularly to linear aromatic polyamic acids and the corresponding linear aromatic polyimides which are prepared from the novel monomer 3,3'bis(3,4-dicarboxyphenoxy)diphenylmethane dianhydride.

2. Description of the Related Art

Linear aromatic polyimides have long been known for their usefulness in meeting aerospace requirements as high performance coating and structural materials. The label of "high performance" for these polymers has implied toughness, flexibility, low density, high temperature stability, chemical and radiation resistance and mechanical strength. Within the past few years, the list has expanded to include low dielectric properties, optical transparency, and improved solubility.

Polyimides have found wide use for insulating aerospace cables and wires, and they are finding new uses in the microelectronics industry. A polymer must be an excellent insulator (low dielectric constant) in order to service this industry. The lower the dielectric constant, the more efficient the circuit. The dielectric constant of commercially available, state-of-the-art polyimide film presently used for electronic applications ranges from 3.2 to 4.0 at 10 GHz depending upon moisture content.

The need exists also for high-temperature, highly optically transparent or colorless film and coating materials for application on large space components such as solar cells, space mirrors, thermal control coating systems, antennae, among many others. Commercial polyimide film is known for its bright yellow color and is not efficient in its transmission of solar energy.

State-of-the-art linear aromatic polyimides are praised for their thermooxidative stability and are by nature insoluble in common organic solvents. This thermal stability often translates into difficult engineering processability. Difficulty in processing is even experienced with the soluble polyimide precursor polyamic acid which during thermal imidization eliminates water and requires higher cure temperatures to remove the strongly associated amide solvent. These volatiles present little trouble for thin films but produce catastrophic voids in thick films and composite parts.

Accordingly, it is an object of the present invention to provide a linear aromatic polyimide which has a dielectric constant in the range 2.7 to 3.1 at 10 GHz.

Another object of the present invention is to provide a linear aromatic polyimide which is thermally stable and optically transparent in the visible region of the electromagnetic spectrum.

Another object of the present invention is to provide a linear aromatic polyimide which is soluble and can be prepared from the corresponding linear aromatic polyamic acid by chemical imidization to produce a polyimide powder.

Another object of the present invention is to provide a dianhydride monomer composition which is employed in the preparation of these polyimides.

Another object of the present invention is to provide a linear aromatic polyamic acid which can be chemically imidized to produce a soluble, thermally stable, highly optically transparent, low dielectric polyimide.

SUMMARY OF THE INVENTION

All of the above objects are achieved by first providing the dianhydride 3,3'bis(3,4-dicarboxyphenoxy)diphenylmethane dianhydride (PDMDA):

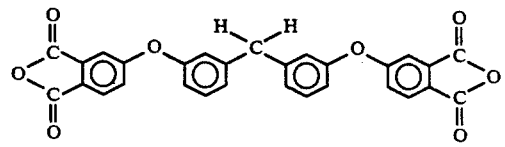

This aromatic dianhydride is then reacted with an aromatic diamine to form the following linear aromatic polyamic acid:

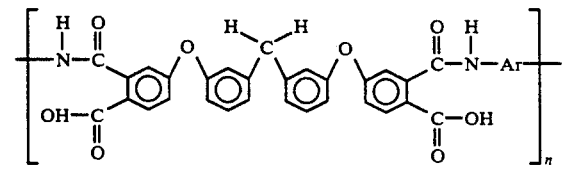

wherein Ar is any aromatic or substituted aromatic group, and n is 10–100.

The linear polyamic acid is then imidized, either thermally or chemically, to produce the following linear aromatic polyimide:

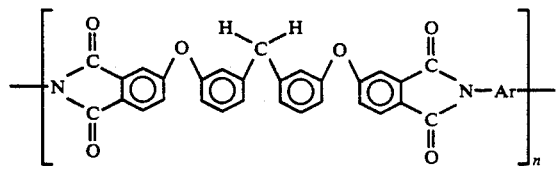

wherein Ar is any aromatic or substituted aromatic group, and n is 10–100.

The resulting polyimide has the following heretofore—unobtainable combination of properties: excellent thermal stability, optical transparency, solubility, and low dielectric constant which is rendered insoluble upon thermally treating the polyamic acid.

BRIEF DESCRIPTION OF THE DRAWINGS

For a more complete understanding of the present invention, including its objects and attending benefits, reference should be made to the Description of the Preferred Embodiments, which is set forth in detail below. This Detailed Description should be read together with the accompanying drawings, wherein.

DESCRIPTION OF THE PREFERRED EMBODIMENTS

Figure 1:
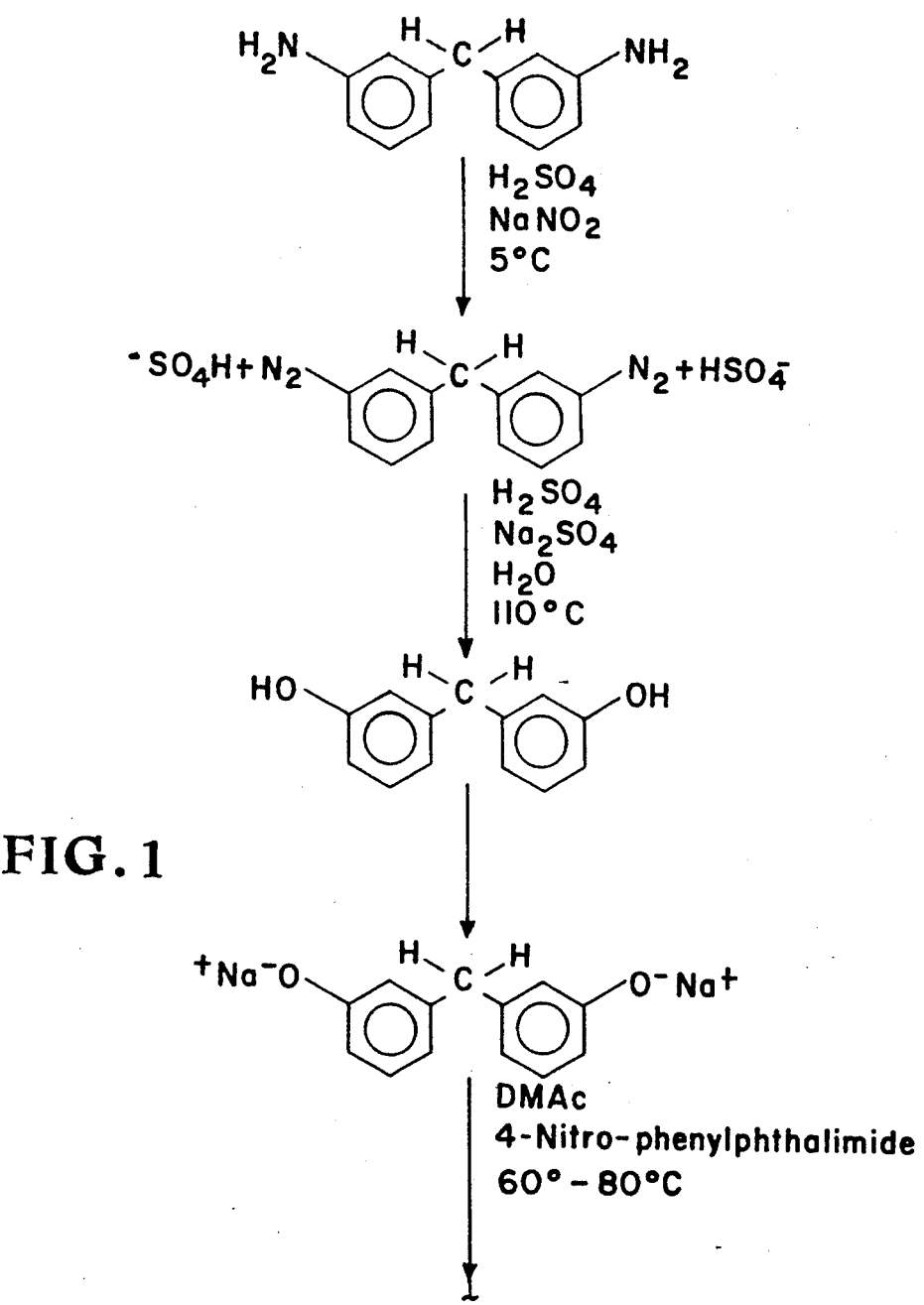
FIG. 1 is a reaction scheme showing the preparation of the dianhydride 3,3'bis(3,4-dicarboxyphenoxy)diphenylmethane dianhydride (PDMDA)
Figure 1:
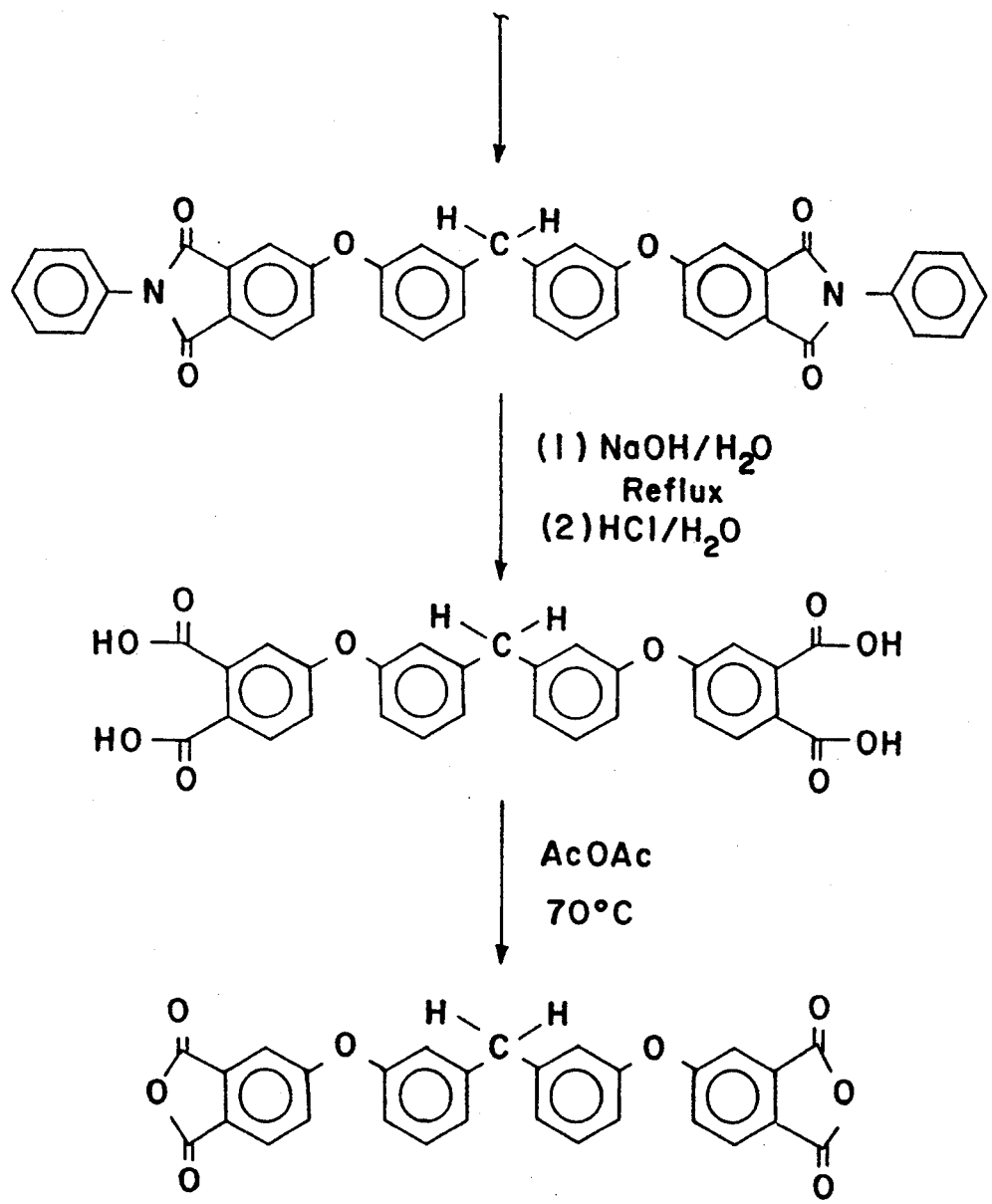

According to the present invention, preparation of the novel dianhydride 3,3'bis(3,4-dicarboxyphenoxy)diphenylmethane dianhydride (PDMDA), is shown in the reaction scheme of FIG. 1. An aromatic dianhydride containing a methylene diphenoxy bridging group is formed by first converting methylenedianiline to a disodium bisphenol salt, reacting this with 4-nitro-N-phenylphthalimide, refluxing in NaOH to remove the bisaniline, and hydrolyzing to the tetracarboxylic acid. The cyclic dianhydride is then formed by reacting the tetra acid with acetic anhydride, precipitating and vacuum drying the final product.

Figure 2:
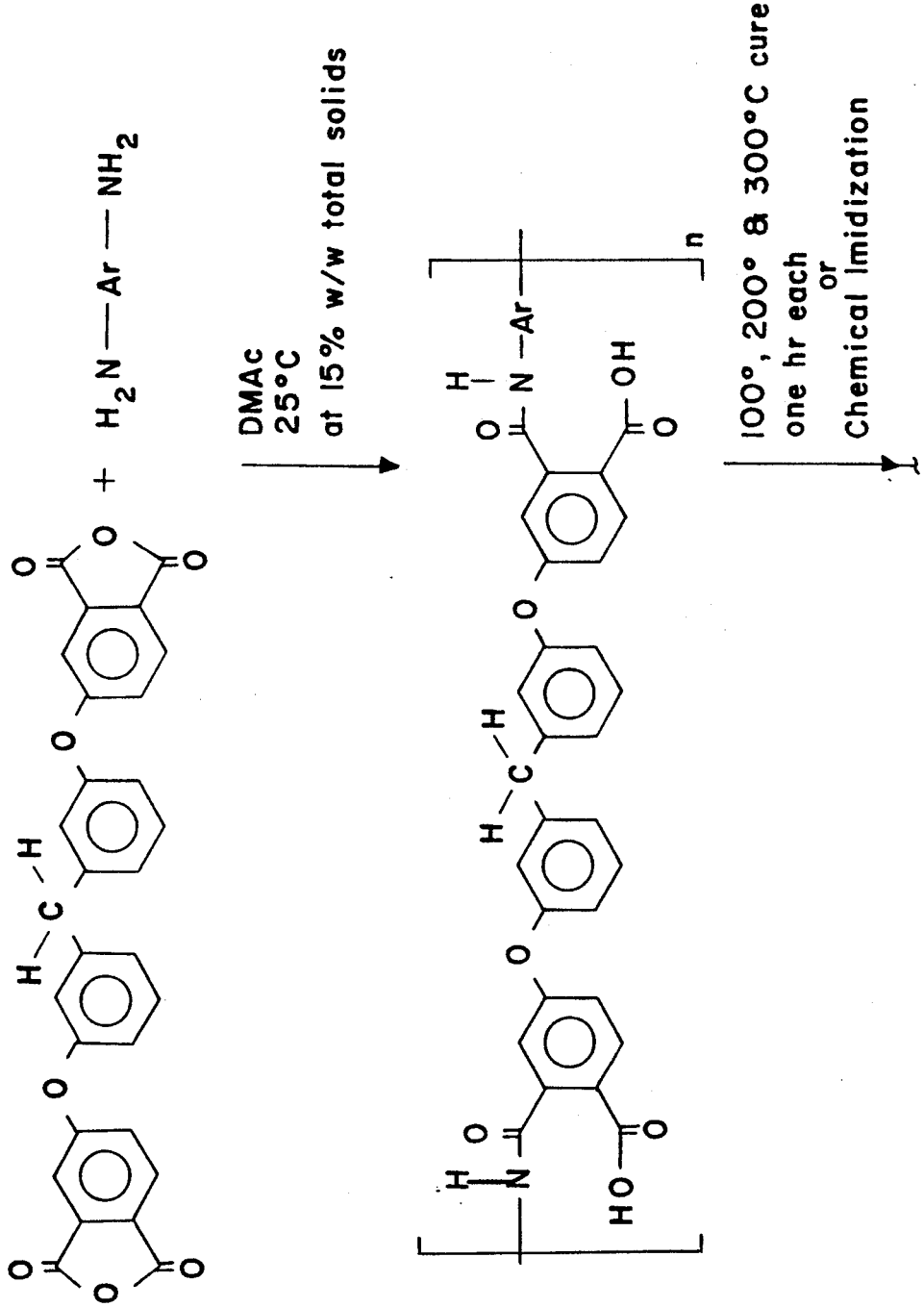
FIG. 2 is a reaction scheme showing the preparation of PDMDA-containing linear aromatic polyamic acids and the corresponding PDMDA-containing linear aromatic polyimides.
Figure 2:
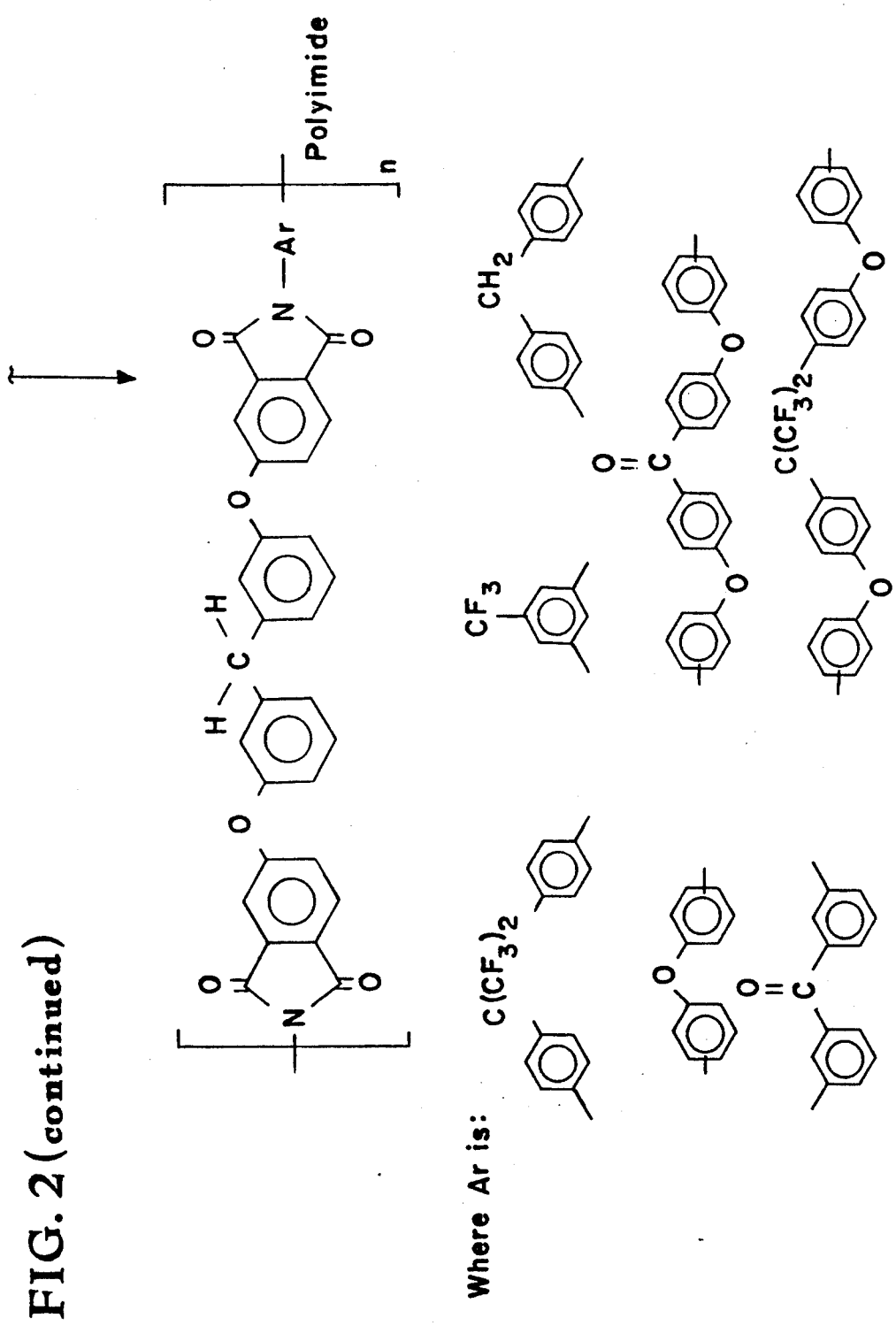

Novel linear aromatic polyimides according to the present invention are produced by reacting the aromatic dianhydride PDMDA with an aromatic diamine as shown in the reaction scheme of FIG. 2. A polyamic acid is first formed when the aromatic diamine in an amide-type solvent is mixed with an equal molar portion of the PDMDA and stirred until a high molecular weight is formed. The reaction is carried out at ambient temperature in a closed vessel. The polyamic acid solution can be applied to a substrate in the form of a thin film or coating and thermally converted to the polyimide; or the amic acid can be chemically imidized, precipitated as a soluble polyimide powder which can be easily processed or applied to a surface and rendered insoluble upon thermal treatment at 300° C. if needed. In Table 1 some properties of the polyimides of the present invention are compared with those of a commercial polyimide Kapton ® H film.

TABLE 1

Properties of Polyimides Prepared from PDMDA

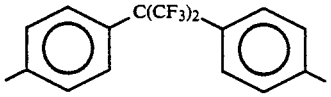

| Polymer Ar | Tg (°C.) | Dielectric Constant[a] | film Appearance[b] | UV cut off[b] nm |
|---|---|---|---|---|
| 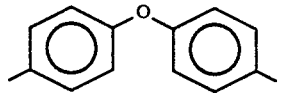<br>4,4'-6F | 195[c]<br>(219)[d] | 2.66<br>(2.76) | Colorless<br>(Pale Yellow) | 362<br>(362) |
| 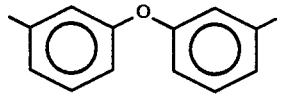<br>4,4'-ODA | 177<br>(200) | 2.89<br>(2.98) | Colorless<br>(Pale Yellow) | 368<br>(370) |
| 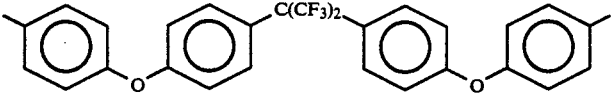<br>3,3'-ODA | 161<br>(182) | 2.85<br>(2.90) | Colorless<br>(Pale Yellow) | 362<br>(365) |
| 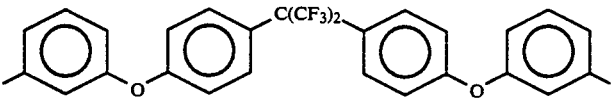<br>4-BDAF | 180<br>(202) | 2.66<br>(2.75) | Colorless<br>(Pale Yellow) | 360<br>(368) |
| <br>3-BDAF | 155<br>(180) | 2.68<br>(2.77) | Colorless<br>(Pale Amber) | 360<br>(360) |

TABLE 1-continued
Properties of Polyimides Prepared from PDMDA

| Polymer Ar | Tg (°C.) | Dielectric Constant[a] | film Appearance[b] | UV cut off[b] nm |
|---|---|---|---|---|
| 4,4'-MDA | 174 (234) | 2.82 (3.11) | Pale to Colorless (Amber) | 366 (433) |
| 3,3'-DABP | 170 (205) | 2.96 (3.11) | Pale to Colorless (Pale Amber) | 370 (374) |
| 3,5-DABTF | 182 (212) | 2.74 (2.92) | Colorless (Pale Amber) | 365 (370) |
| 4-BAPBP | 179 (199) | 2.97 (3.06) | Pale to Colorless (Pale Amber) | 372 (376) |
| 3-BAPBP | 160 (184) | 2.92 (3.03) | Pale to Colorless (Pale Amber) | 368 (372) |
| Commercial Kapton ® H Film | | 3.2 | Bright Yellow | 462 |

[a] @10GHZ, 1 mil film.
[b] 0.5 mil film.
[c] Films cured to 300° C. in vacuum
[d] Films cured to 300° C. in air.

The PDMDA films according to the present invention were cured in vacuum and air to 300° C. All films of the present invention possess lower dielectric constants and significantly higher optical transparency than the commercial film. The air cured films had slightly higher dielectric constants and lower optical transparency than the vacuum cured films, because of oxidative crosslinking of the $CH_2$ group in the dianhydride. Although air cured films displayed slightly higher dielectric constants than vacuum cured films, dielectric constants were still lower than the commercial film. Although the aromatic diamines shown in FIG. 2 were used to prepare the polyimides of the present invention, other diamines could foreseeably be used to produce a high temperature linear aromatic polyimide having similar properties. N,N-dimethylacetamide (DMAc) was used as the solvent in the preparation of the polyamic acids of the present invention. Other useful solvents include amide-type solvents such as N,N-dimethylformamide, N-methyl-2-pyrrolidone, and dimethylsulfoxide, or ether-type solvents such as tetrahydrofuran, m- and p-dioxane and 1,2-bis(2-methoxyethoxy)ethane. Also, other solids concentrations can be used as long as adequate flow characteristics are maintained to form a thin film.

EXAMPLES

EXAMPLE 1

In a one liter, three-neck flask equipped with a mechanical stirrer, 50.0 g (0.252 moles) of 3,3'-diaminodiphenylmethane was dissolved in a solution of 72 ml of concentrated sulfuric acid and 380 g of water. To this was added 34.5 g (0.500 moles) of sodium nitrite dissolved in 100 ml of water of a period of one-half hour at 5° C., and the solution was then held below 5° C. for an additional one and three-tenths hours. After deoxidization was complete, an additional 500 ml of cold water was added.

A hydrolyzing solution was prepared by dissolving 200 ml concentrated sulfuric acid and 112 g sodium sulfate in 20 ml of water. The temperature of this solution was raised to 110° C. and the diazonium salt solution from above was added dropwise to the hydrolyzing solution over one and one-half hours. After complete addition, the mixture was held at 110° C. for eight-tenths of an hour. After cooling and dividing into two portions, each portion was extracted six times with 50 ml of ether. The tar remaining in the reaction flask was also extracted three times with 100 ml each of ether. The combined ether extracts were washed with 20 ml of water and dried with anhydrous magnesium sulfate. The ether was removed in vacuo. The product was distilled though a short column, b.p. 210°–275° C. (0.5 mm) and then recrystallized from benzene to afford 29.6 g (58.7%) of 3,3'-dihydroxydiphenylmethane, m.p. 94.5°–100.5° C. Analysis: Calculated for $C_{13}H_{12}O_2$: C, 77.9%; H, 6.04%. Found: C, 78.18%; H, 6.30%.

The 3,3'-dihydroxydiphenylmethane (129 g, 0.065 moles) was reacted with a solution of 40 ml anhydrous methanol containing 2.97 g (0.130 moles) of freshly cut sodium metal and 100 ml toluene. The mixture was taken to reflux and cooled before the solvents were removed in vacuo. This disodium salt was dissolved in 150 ml anhydrous N,N-dimethylacetamide (DMAc) before 34.9 g (0.130 moles) of 4-nitro-N-phenylphthalimide was added. The mixture was heated at 60°–80° C. with stirring for two hours. The resulting viscous mass, when cooled was slurried three times with 500 ml water, filtered and dried. The crude yield was 33.6 g (80.5%) m.p. 200°–216° C. Recrystallization from toluene gave N,N-diphenyl-bis(3,4-dicarboxyphenoxy-3'-phenyl)methane diphthalimide, m.p. 220°–224° C. Analysis: Calculated for $C_{41}H_{26}N_2O_6$: C, 76.63%; H, 4.08%; N, 4.36%. Found: C, 76.22; H, 4.16%; N, 4.38%.

The hydrolysis of 25 g of the N,N'-diphenyl-bis(3,4-dicarboxyphenoxy-3'-phenyl)methane dipthalimide was conducted in a solution of 270 g of sodium hydroxide in two liters of water at reflux for 20 hours. Additional water was periodically added to replace that lost as a result of the aniline-water azeotrope. The resulting tetracarboxylic acid salt was acidified by pouring into excess aqueous 6N hydrochloric acid. The resulting tetracarboxylic acid was rinsed with water and vacuum dried at 110° C. The yield was 17.2 g (84%) and a m.p. between 143°–220° C. This broad melting was due to melting and cyclodehydration occurring simultaneously.

The crude tetracarboxylic acid (17.2 g) from above was slurried in 100 ml acetic anhydride at 70° C. for three and three-tenths hours, filtered hot to remove trace insolubles and cooled at 0° C. overnight. The dianhydride precipitated as an off-white fine powder. Vacuum drying afforded 11.7 g (61%) of 3,3'-bis(3,4-dicarboxyphenoxy)diphenylmethane dianhydride (PDMDA). DTA analysis gave one sharp endotherm at 147.5° C. Analysis: Calculated for $C_{29}H_{16}O_8$: C, 70.73; H, 3.28%. Found: C, 70.95%; H, 3.28%.

EXAMPLE 2

To a dry vessel was added 0.6065 g (0.0018 moles) of as received 2,2-bis(4-aminophenyl)hexafluoropropane (4,4'-6F) m.p. 79° C. and 4.25 g of as received dry DMAc. A magnetic stirrer was used to aid dissolution. Immediately after the diamine completely dissolved, 0.8935 g (0.0018 moles) of recrystallized PDMDA was added to the stirring diamine/DMAc solution. Stirring was continued for a period of 14 hours to allow the dianhydride to dissolve and react to form a polyamic acid. The measured solution inherent viscosity of this polyamic acid was 0.49 dl/g at 35° C.

A film of the PDMDA/4,4'-6F polyamic acid was prepared by casting the polyamic acid solution (15% solids by weight) onto a soda-lime glass plate. The solution was spread by an aluminum blade with the gap set so as to ensure a final film thickness (after thermal cure) of about 1.0 mil and/or about 0.5 mil. The solution cast films were air dried for about seven hours in a dust-free chamber at a relative humidity of ten percent. The polyamic acid film was thermally converted to the corresponding polyimide by heating in a forced air oven or vacuum oven for one hour each at 100°, 200° and 300° C. The resulting tough and flexible polyimide film was removed from the glass plate after cooling to room temperature by immersion in water.

EXAMPLE 3

Using the same method and conditions as described in Example 2 of the present invention, equimolar amounts of 4,4'-oxydianiline (4,4'-ODA) (m.p. 187° C.) and PDMDA were dissolved in DMAc to form a polyamic acid having an inherent viscosity of 0.89 dl/g. Resulting films cured in air and vacuum were tough and flexible.

EXAMPLE 4

Using the same method and conditions as described in Example 2 of the present invention, equimolar amounts of 3,3'-oxydianiline (3,3'-ODA) (m.p. 78) and PDMDA were dissolved in DMAc to form a polyamic acid having an inherent viscosity of 0.58 dl/g.

EXAMPLE 5

Using the same method and conditions as described in Example 2 of the present invention, equimolar amounts of 2,2-bis[4(3-aminophenoxy)phenyl] hexafluoropropane (3-BDAF) (m.p. 133° C.) and PDMDA were dissolved in DMAc to form a polyamic acid having an inherent viscosity of 0.83 dl/g.

EXAMPLE 6

Using the same method and conditions as described in Example 2 of the present invention, equimolar amounts of 2,2-bis[4(4-aminophenoxy)phenyl] hexafluoropropane (4-BDAF) (m.p. 162° C.) and PDMDA were dissolved in DMAc to form a polyamic acid having an inherent viscosity of 1.26 dl/g.

EXAMPLE 7

Using the same method and conditions as described in Example 2 of the present invention, equimolar amounts of 4,4'-methylenedianiline (4,4'-MDA) (m.p. 87° C.) and PDMDA were dissolved in DMAc to form a polyamic acid having an inherent viscosity of 0.84 dl/g.

EXAMPLE 8

Using the same method and conditions as described in Example 2 of the present invention, equimolar amounts of 3,3'-diaminobenzophenone (3,3'-DABP) (m.p. 152° C.) and PDMDA were dissolved in DMAc to form a polyamic acid having an inherent viscosity of 0.72 dl/g.

EXAMPLE 9

Using the same method and conditions as described in Example 2 of the present invention, equimolar amounts of 3,5-diaminobenzotrifluoride (3,5-DABTF) (m.p. 183° C.) and PDMDA were dissolved in DMAc to form a polyamic acid having an inherent viscosity of 0.35 dl/g.

EXAMPLE 10

Using the same method and conditions as described in Example 2 of the present invention, equimolar amounts of 4,4'-bis(4-aminophenoxy)benzophenone (m.p. 152° C.) and PDMDA were dissolved in DMAc to form a polyamic acid having an inherent viscosity of 0.90 dl/g.

EXAMPLE 11

Using the same method and conditions as described in Example 2 of the present invention, equimolar amounts of 4,4'-bis(3-aminophenoxy) benzophenone (m.p. 137° C.) and PDMDA were dissolved in DMAc to form a polyamic acid having an inherent viscosity of 0.60 dl/g.

EXAMPLE 12

The polyamic acid of PDMDA/4-BDAF was prepared by the method of Example 2. Chemical imidization of this PDMDA/4-BDAF polyamic acid resin (15% w/w) was carried out in a dry 100 ml three-neck flask. A small separatory funnel was attached to the middle neck and a nitrogen gas source and bubbler was attached to the outer necks. Three ml each of pyridine and acetic anhydride was added to the flask and mixed with a magnetic stirrer. PDMDA/4-BDAF (2.45 g) was placed in the separatory funnel and added to the stirring pyridine/acetic anhydride mixture in a steady dropwise manner. The amic acid/pyridine/acetic anhydride solution was allowed to stir for 15 minutes, then immediately the solution was added dropwise to a blender containing 350 ml of water in order to precipitate the PDMDA/4-BDAF polyimide. The pale yellow polyimide precipitate was filtered and rinsed with water and vacuum dried overnight at room temperature. The polyimide powder was soluble at ambient temperature in amide and chlorinated solvents.

The foregoing specific examples are exemplary and are not to be considered as exhaustive, but merely to illustrate the invention without serving as limitations thereon.

What is claimed is:

1. A linear aromatic polyamic acid having the following general structural formula:

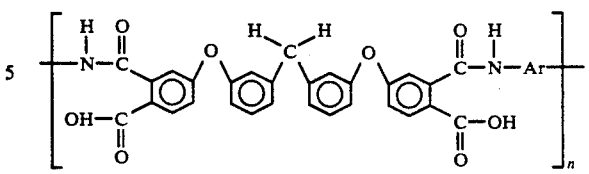

wherein Ar is any aromatic or substituted aromatic group, and n is 10-100.

2. A high-temperature stable, optically-transparent, low dielectric linear aromatic polyimide having the following general structural formula:

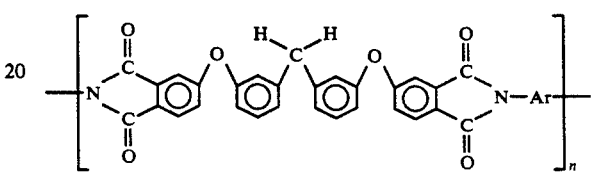

wherein Ar is any aromatic or substituted aromatic group and n is 10-100.

3. A high-temperature stable, aromatic polyimide prepared by reacting 3,3'-bis(3,4-dicarboxyphenoxy)diphenylmethane dianhydride and an aromatic diamine in an amide solvent to form a polyamic acid followed by cyclizing the polyamic acid to form the corresponding polyimide.

4. The polyimide of claim 3, wherein the aromatic diamine is a member of the group consisting of:

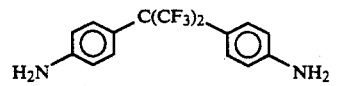

2,2-Bis(4-aminophenyl)hexafluoropropane

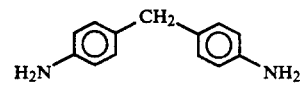

4,4'-Methylenedianiline

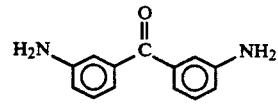

3,3'-Diaminobenzophenone

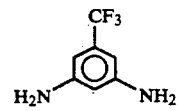

3,5-Diaminobenzotrifluoride

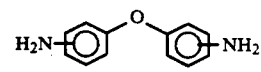

Oxydianiline

-continued

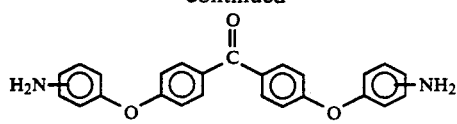

4,4'-Bis(aminophenoxy)benzophenone

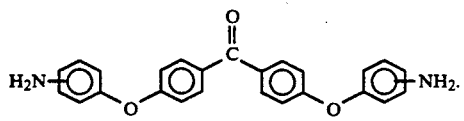

2,2-Bis[4(aminophenoxy)phenyl]hexafluoropropane

5. The polyimide of claim 4, wherein the amide solvent is a member of the group consisting of:
N,N-dimethylacetamide,
N,N-dimethylformamide,
N-methyl-2-pyrrolidone, and
dimethylsulfoxide.

6. A film or coating prepared from the polyimide of claim 4, which is highly optically transparent-to-colorless and has a dielectric constant in the range of 2.7–3.1 when measured at 10 GHz.

7. The polyimide of claim 3, wherein the polyamic acid is cyclized to form the corresponding polyimide by chemical imidization to produce a precipitate of the corresponding polyimide.

8. The polyimide of claim 7, wherein the chemical imidization comprises adding a solution of the polyamic acid to a solution of acetic anhydride and pyridine.

9. The polyimide of claim 8, wherein the polyimide precipitate is dissolved in a solvent, and a film layer thereof is applied to a substrate, followed by heat treating thereof to remove solvent and produce a high-temperature stable polyimide film or coating.

* * * * *